(12) United States Patent
Fukuda et al.

(10) Patent No.: US 7,800,011 B2
(45) Date of Patent: Sep. 21, 2010

(54) MIG WELDED JOINT BETWEEN ALUMINUM AND STEEL MEMBERS AND MIG WELDING PROCESS

(75) Inventors: Toshihiko Fukuda, Ohbu (JP); Masaki Kumagai, Nagoya (JP)

(73) Assignee: Sumitomo Light Metal Industries, Ltd., Minato-Ku (JP)

(*) Notice: Subject to any disclaimer, the term of this patent is extended or adjusted under 35 U.S.C. 154(b) by 254 days.

(21) Appl. No.: 12/033,964

(22) Filed: Feb. 20, 2008

(65) Prior Publication Data

US 2008/0206593 A1    Aug. 28, 2008

(30) Foreign Application Priority Data

Feb. 27, 2007   (JP) ............................. 2007-047766

(51) Int. Cl.
*B23K 9/23* (2006.01)
*B23K 103/20* (2006.01)
*C22C 21/02* (2006.01)
*C22C 21/06* (2006.01)

(52) U.S. Cl. ........................................ 219/74; 428/653

(58) Field of Classification Search ....................... None
See application file for complete search history.

(56) References Cited

U.S. PATENT DOCUMENTS 7,521,129 B2 * 4/2009 Takeda et al. ............... 428/653

2008/0206594 A1 * 8/2008 Fukuda et al. .............. 428/653

FOREIGN PATENT DOCUMENTS

| JP | 2003-033865 A1 | 2/2003 |
|---|---|---|
| JP | 2003-211270 A1 | 7/2003 |
| JP | 2004-223548 A1 | 8/2004 |
| JP | 2005-000989 A1 | 1/2005 |
| JP | 2006-088174 A1 | 4/2006 |
| JP | 2006-116599 A1 | 5/2006 |
| JP | 2006-224145 A1 | 8/2006 |
| JP | 2006-224147 A1 | 8/2006 |

OTHER PUBLICATIONS

U.S. Appl. No. 12/033,970, filed Feb. 20, 2008, Fukuda et al.

* cited by examiner

*Primary Examiner*—Aaron Austin
(74) *Attorney, Agent, or Firm*—Burr & Brown

(57) ABSTRACT

A MIG welded joint between aluminum and steel members is obtained by overlapping the aluminum member and the steel member each other and performing MIG welding using a filler wire made of a 4000 or 5000 series aluminum alloy on an end face of the overlapped aluminum member, wherein the aluminum member has a thickness P ranging from 0.5 to 2.0 mm, and the steel member has a thickness Q satisfying the following formula: $0.6 \leqq Q/P \leqq 0.8$, whereby a penetration depth of the steel member is equal to or less than 5% of the thickness Q thereof.

8 Claims, 4 Drawing Sheets

MIG WELDED JOINT BETWEEN ALUMINUM AND STEEL MEMBERS AND MIG WELDING PROCESS

This application is based on Japanese Patent Application No. 2007-047766 filed on Feb. 27, 2007, the contents of which are incorporated hereinto by reference.

BACKGROUND OF THE INVENTION

1. Field of the Invention

The present invention relates to a metal inert gas (MIG) welded joint between aluminum and steel members and a MIG welding process, and in particular to a MIG welding technique used for welding an overlapped region which is made by overlapping planar portions of dissimilar materials, namely, the aluminum and steel members.

2. Description of the Related Art

In recent years, from the viewpoint of protecting the global environment and saving energy, there is required restriction of emissions of harmful gases and carbon dioxide emitted by automobiles, and also required improvement of mileage. In order to respond to such requirements, reduction in weight of vehicle body is the most effective to meet the requirement, so that there are actively studied replacements of steel members with aluminum members, as members to form body parts and other various parts. However, in terms of production cost, it is difficult to convert all the members of vehicle body parts and components into aluminum members. Thus, when the member formed of aluminum is used, it is inevitable to perform dissimilar metal welding between aluminum and steel, namely, hybrid welding, which has been a major concern. In addition, the hybrid welding between aluminum and steel is required not only in the field of transportation vehicles represented by the above-mentioned automobiles, but also in other various fields relating to home electric appliances, construction materials such as building materials, and the like. In those fields, strong welding is an essential requirement.

Therefore, there have been studied various processes of joining together an aluminum member and a steel member, which include the following mechanical connection, such as connection by caulking or using a riveting or a bolt. However, each of these processes inherently has problems in terms of an efficiency of the joining operation, a reliability of the joint, and a cost of the joint, to a greater or less extent.

In addition, considerable improvement in productivity can be expected by employing a conventional fusion welding process such as arc welding commonly used for welding metal members. However, when aluminum and steel members are welded by such a fusion welding process, heat input at the time of welding becomes excessively high and a metallurgical reaction occurs between the molten aluminum and steel members. Thereby, at a welded interface between those members, a brittle and hard intermetallic compound (such as $Fe_2Al_5$ or $FeAl_3$) is thickly formed. In consequence, the portion where the compound is formed suffers cracks, so that the applicable joint strength to a practical use cannot be obtained. As can be seen from the above, it has been extremely difficult to perform melt welding between aluminum and steel members.

In a patent document 1 (JP-A-2003-211270), a patent document 2 (JP-A-2003-33865), a patent document 3 (JP-A-2004-223548), a patent document 4 (JP-A-2006-88174), a patent document 5 (JP-A-2006-116599), a patent document 6 (JP-A-2006-224145) and a patent document 7 (JP-A-2006-224147), there are disclosed various processes for welding dissimilar metals of aluminum and steel members by using a MIG welding process, which is a kind of arc welding. However, in the patent document 1, since aluminum and steel members are directly welded by a MIG brazing process using a wire made of copper alloy or nickel alloy, welding cost is increased and a sufficient welding strength is unlikely to be obtained. Therefore, there is still a room for improvement. In the patent document 2, as a filler metal, a flux cored wire is employed in which the flux containing at least caesium fluoride, aluminum fluoride, potassium fluoride, and aluminum oxide as components is coated with aluminum member, thereby suppressing formation of a brittle and thick intermetallic compound layer. However, since the flux remains as slag on a surface of a weld zone, an operation to remove the slag, which covers the surface thereof, is necessary. Thus, problems such as productivity deterioration and an increase in product cost are inherent in the process disclosed in the patent document 2.

In the patent documents 3 to 7, as a filler wire, instead of a brazing filler metal or a flux cored wire, there is employed a solid wire made of aluminum alloy. However, without any particular consideration about a thickness relationship between aluminum and steel members, aluminum and steel members having the same thickness are welded, or a steel member thicker than an aluminum member is welded therewith. Accordingly, even if control is provided to reduce heat input, due to a great difference between rigidities of both members, in other words, due to greater rigidity or stiffness of the steel member than that of the aluminum member (in the case of the same thickness, a rigidity ratio of steel member to aluminum member is about 3 to 1), stress by thermal distortion concentrates when solidification shrinkage occurs after a welding process, whereby local deformation occurs at a weld zone. Accordingly, there is a problem that a defective portion is generated and thus a sufficient joint strength cannot be secured.

In the patent documents 3 to 7, the employed steel members are surface-coated with zinc or zinc-alloy and aluminum or aluminum alloy. There is no disclosure about a process for performing MIG welding between a bare steel member and an aluminum member. Therefore, there has been a desire for a welding process that can form a sound weld zone between aluminum and steel members and secure a sufficient joint strength regardless of the presence or absence of a surface-coated layer or a surface treated layer on a steel member surface.

SUMMARY OF THE INVENTION

The present invention has been made in the light of the situations described above. It is therefore a first object of the invention to provide a MIG welded joint between aluminum and steel members, which has enhanced soundness of a weld zone and an excellent joint strength. It is a second object of the invention to provide a process for performing MIG welding between aluminum and steel members, in which control is provided in order to reduce heat input, when the MIG welding is performed between the dissimilar members overlapped with each other, thereby effectively increasing the soundness of the weld zone.

The first object described above may be achieved according to a first aspect of the present invention, which provides a MIG welded joint between aluminum and steel members obtained by overlapping the aluminum member and the steel member each other and performing MIG welding using a filler wire or made of a 4000 or 5000 series aluminum alloy on an end face of the overlapped aluminum member, wherein the aluminum member has a thickness P ranging from 0.5 to 2.0 mm, and the steel member has a thickness Q satisfying the following formula: $0.6 \leq Q/P \leq 0.8$, whereby a penetration depth of the steel member is 5% or less of the thickness Q thereof.

In a preferred form of the MIG welded joint between aluminum and steel members according to the first aspect of the present invention, the aluminum member have a tensile strength of 90 MPa or more in an O temper condition.

The second object of the present invention may be achieved according to a second aspect of the present invention, which provides a process for performing MIG welding between aluminum and steel members, by overlapping the aluminum member and the steel member each other and performing a MIG welding operation on an end face of the aluminum member, comprising the steps of: (A) providing the aluminum member having a thickness P ranging from 0.5 to 2.0 mm and the steel member having a thickness Q satisfying the following formula: $0.6 \leq Q/P \leq 0.8$; (B) providing a filler wire made of a 4000 or 5000 series aluminum alloy having a diameter L ranging from 0.8 to 1.6 mm; (C) locating the filler wire such that, a center line of the filler wire is positioned between a distance of L away from a reference point toward an overlapped region of the aluminum and the steel members and a distance of 2L away from the reference point toward a side opposite to the overlapped region, the reference point being set at a corner of an end face of the aluminum member on the steel member side; and (D) applying a pulsed DC to the filler wire so as to constantly form a molten weld pool at a weld zone, the pulsed DC allowing one molten droplet to fall with each pulse at a pulse frequency of 0.5 to 5 times per a welding length of 1 mm, while allowing the filler wire to come into contact with the molten weld pool at a frequency of 0.1 to 4 times per a welding length of 1 mm in order to cause short circuit, whereby the MIG welding operation is performed along the end face of the aluminum member.

In a preferred form of the MIG welding process between aluminum and steel members according to the second aspect of the invention, the aluminum member has tensile strength of 90 MPa or more in an O temper condition. More preferably, the aluminum member is made of one of a 5000 series aluminum alloy, a 6000 series aluminum alloy, and a 7000 series aluminum alloy.

In another preferred form of the MIG welding process between aluminum and steel members according to the second aspect of the invention, the aluminum and steel members are overlapped with each other such that an overlap width is 3 mm or greater when the thickness P of the aluminum member is 1 mm or less, while the overlap width is 3P or greater when the thickness P thereof exceeds 1 mm.

In another preferred form of the MIG welding process between aluminum and steel members according to the second aspect of the invention, the steel member is made of one of non-surface-coated mild steel, carbon steel, high tensile strength steel, and stainless steel.

In another preferred form of the MIG welding process between aluminum and steel members according to the second aspect of the invention, the steel member is made of one of hot-dip zinc-coated steel, galvannealed steel, aluminum alloy coated steel, and electrogalvanized steel.

As described above, in the MIG welded joint between aluminum and steel members according to the first aspect of the present invention, the members are overlapped with each other, and the overlapped aluminum member has the thickness P ranging from 0.5 to 2.0 mm, which can reduce heat input required to melt the end face of the aluminum member. As a result, a penetration depth of the steel member can be made 5% or less of the thickness of the steel member, which can effectively prevent that a brittle intermetallic compound layer is thickly formed at a welded interface between the members. In addition, the thickness Q of the overlapped steel member satisfies the formula: $0.6 \leq Q/P \leq 0.8$. In other words, a ratio of the thickness Q of the overlapped steel member to the thickness P of the overlapped aluminum member (Q/P) falls within the range of 0.6 to 0.8, thereby appropriately uniforming the rigidity of the members. Accordingly, in time of solidification shrinkage after welding process, it is possible to prevent the generation of a defective portion which is caused by concentration of stress due to thermal distortion and the subsequent local deformation at the weld zone.

In the MIG welded joint between aluminum and steel members according to the first aspect of the present invention, the aluminum and steel members are overlapped with each other and the MIG welding is performed on the end face region of the overlapped aluminum member by using the filler wire made of the aluminum alloy, thereby eliminating the operation to remove slag and preparation of a large-scale equipment. Consequently, as compared to welding using a brazing filler metal or a flux cored wire, productivity is improved and resulting in reduction of production cost.

In addition, the filler wire is made of a 4000 or 5000 series aluminum alloy. This increases the strength of a weld metal, thereby realizing strong welding between the aluminum and steel members.

As described above, in the MIG welded joint between aluminum and steel members according to the first aspect of the present invention, the penetration depth of the steel member is kept 5% or less of the thickness thereof, and deformation due to thermal distortion at the weld zone is prevented, whereby the soundness of the weld zone is favorably increased and the aluminum and steel members are strongly welded with each other by the weld metal. Therefore, the MIG welded joint according to the first aspect of the present invention can greatly secure joint efficiency, which provides an indication of joint strength (a ratio of a breaking strength of the joint member under tension to a breaking strength of the aluminum member as a joint base metal or a joint parent material under tension).

In one of the preferred forms of the MIG welded joint between aluminum and steel members according to the first aspect of the present invention, there is employed the aluminum member having a tensile strength of 90 MPa or more in an O temper condition, thereby improving a breaking stress of the welded joint in tension.

In the MIG welding process between the aluminum and steel members according to the second aspect of the present invention, those members are overlapped with each other, and the thickness P (mm) of the overlapped aluminum member is set from 0.5 to 2.0 mm, while the thickness Q (mm) of the overlapped steel member is set so as to satisfy the formula: $0.6 \leq Q/P \leq 0.8$, thereby effectively preventing the formation of a thick brittle intermetallic compound layer at the welded interface between the aluminum and steel members and the generation of defective portion by local deformation at the weld zone.

In the MIG welding process according to the second aspect of the present invention, the filler wire is made of the 4000 or 5000 series aluminum alloy, thereby, as described above, highly securing the strength of the weld metal and realizing stronger welding between the aluminum and steel members.

In the MIG welding process according to the present invention, the filler wire having the diameter L ranging from 0.8 to 1.6 mm is employed, thereby favorably preventing a welding current required to melt the filler wire from becoming excessively high. In addition, the filler wire is arranged such that the center line thereof is positioned within the range of a predetermined distance in the proximity of the end face of the aluminum member. More specifically, with the reference point is set at a corner of an end face of the aluminum member on the steel member side, the center line of the filler wire is arranged so as to be positioned between a distance of L away from the reference point toward the overlapped region and a distance of 2L away from the reference point toward a side opposite to the overlapped region, thereby generating arc above the intended welded region (in the proximity of the end face of the aluminum member) and the end face region of the aluminum member can be effectively molten without increasing heat input. Accordingly, the aluminum and steel members can be welded with a good welding quality.

In the MIG welding process according to the second aspect of the present invention, particularly, the pulsed DC is applied to the filler wire so as to constantly form a molten weld pool at a region immediately below arc (a region under welding by irradiating the arc on a forward side in the welding direction), the pulsed DC allowing one molten droplet to fall with each pulse at a pulse frequency of 0.5 to 5 times per a welding length (the length in a welding direction) of 1 mm, while allowing the filler wire to come into contact with the molten weld pool at a frequency of 0.1 to 4 times per a welding length of 1 mm in order to cause short circuit, whereby the MIG welding operation is performed along the end face of the aluminum member. According to the process, as compared to the conventional processes, heat input can be more practically and easily controlled, thereby advantageously preventing an excessive heat input. Accordingly, the aluminum member having a melting point lower than the steel member can be efficiently molten, the occurrence of a defective portion due to insufficient melting can be prevented, and penetration of the steel member can be favorably suppressed. As a result, it can be prevented that a thick intermetallic compound layer is formed at the welded interface. In addition, due to the employment of the pulsed DC instead of AC, the filler wire is constantly connected to a positive pole (anode), thereby sufficiently exhibiting cleaning action to remove an oxide film on the welded member. Therefore, the molten aluminum can favorably be spread wettingly over a surface of the steel member without being shed therefrom. As a result, the aluminum member can be favorably welded with the steel member, and a sound weld zone can be formed.

Consequently, in the MIG welding process between aluminum and steel members according to the second aspect of the present invention, low heat input can be maintained. Thus, while the aluminum member can be sufficiently molten, the penetration of the steel member can be maximally prevented. This can effectively prevent formation of a brittle intermetallic compound layer at the welded interface between the members and occurrences such as local deformation due to a rigidity difference between the aluminum and steel members. Thereby, the soundness of the weld zone can be effectively improved and the obtained welded joint can be favorably prevented from breaking or separating at the welded interface.

In the preferred form of the MIG welding process between aluminum and steel members according to the second aspect of the present invention, there is employed the aluminum member having tensile strength of 90 MPa or more in an O temper condition. More preferably, there is employed the aluminum member made of one of a 5000 series aluminum alloy, a 6000 series aluminum alloy, and a 7000 series aluminum alloy. Using any one of the aluminum alloys allows a breaking stress under tension of the welded joint to be further improved.

In another preferred form of the MIG welding process according to the second aspect of the present invention, the overlap width between the aluminum and steel members is set to the predetermined size, thereby releasing the heat inputted to the weld zone through the overlapped region. Therefore, penetration of the steel member due to heat accumulation can be advantageously suppressed.

In another preferred form of the MIG welding process according to the second aspect of the present invention, the steel member is made of one of non-surface-coated mild steel, carbon steel, high tensile strength steel, and stainless steel, thereby allowing the penetration of the steel member to be shallow and obtaining a welded joint having an excellent joint strength. In other words, according to the second aspect of the present invention, without forming a layer subjected to surface treatment or surface coating such as plating on the steel member surface, the aluminum and steel members can be welded with each other with an excellent welding quality.

In another preferred form of the MIG welding process between aluminum and steel members according to the second aspect of the present invention, the steel member is made of one of hot-dip zinc-coated steel, galvannealed steel, aluminum alloy coated steel, and electrogalvanized steel, whereby the arc and the molten metal are not directly contacted with the steel member due to the presence of the surface-coated layer. As a result, the penetration of the steel member can be more favorably prevented and formation of a brittle intermetallic compound layer can be prevented.

BRIEF DESCRIPTION OF THE DRAWINGS

The above and other objects, features, advantages and technical and industrial significance of the present invention will be better understood by reading the following detailed description of a presently preferred embodiment of the invention, when considered in connection with the accompanying drawings, in which.

DETAILED DESCRIPTION OF THE PREFERRED EMBODIMENTS

Figure 1:
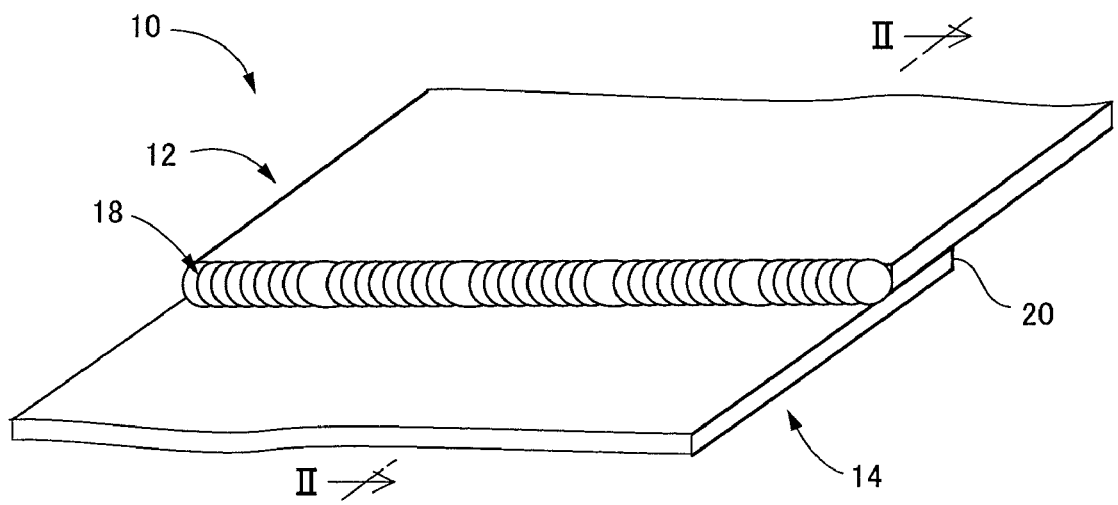
FIG. 1 is a perspective view showing an example of a MIG welded joint between aluminum and steel members according to the present invention.

To further clarify the present invention, there will be described preferred embodiments of the invention by referring to the drawings.

Figure 2:
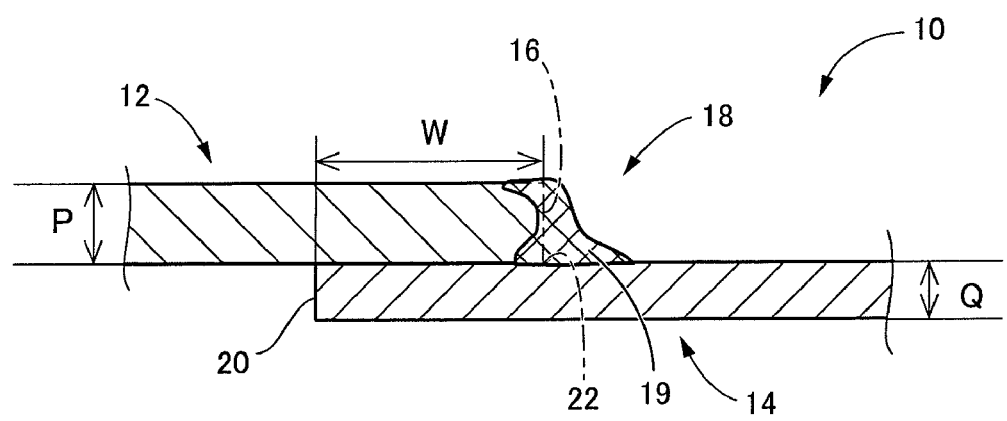
FIG. 2 is a cross sectional view taken along line II-II of FIG. 1.

Referring first to FIGS. 1 and 2, there are shown a perspective view and an axial cross sectional view, respectively, schematically showing an embodiment of a MIG welded joint between aluminum and steel members according to the present invention. As shown in FIGS. 1 and 2, in a state where an aluminum member 12 having planar shape and a steel member 14 having planer shape that have different thicknesses are overlapped with each other at end regions thereof in such a manner that the aluminum member 12 is positioned on top of the steel member 14, the region of an end face 16 (indicated by a single-dot chain line in FIG. 2) of the aluminum member 12 is welded by MIG welding (lap fillet welding) to form a weld zone 18 which integrates the members, thereby forming a MIG welded joint 10.

As shown in FIG. 1, in this embodiment, the aluminum member 12 and the steel member 14 are welded together over an entire length of an overlapped region thereof. Therefore, the weld zone 18 is formed so as to extend continuously over the entire length thereof along the end face 16 of the aluminum member 12. As shown in FIG. 2, the weld zone 18 has a substantially triangular sectional shape combining orthogonal two surfaces, namely, the end face 16 of the aluminum member 12 and an upper surface of the steel member 14.

Of the two metal members to be welded, which are overlapped in upper and lower directions as described above, a material of the aluminum member 12 located at the upper side is not particularly limited as long as it is aluminum or an aluminum alloy. The material thereof is selected appropriately in accordance with characteristics required for an intended joint. It is preferable to employ the material having tensile strength of 90 MPa or more in an O temper condition (aluminum material, which is designated as a temper O according to JIS (Japanese Industrial Standards) H 0001, and which is in the softest state by annealing). However, the temper of the aluminum member subjected to the MIG welding is not limited to O temper and the temper may be any temper of O, H, T or the like. In the present invention, the tensile strength is a strength measured based on a "metal material tensile test method" defined in the JIS Z 2241. When the tensile strength is less than 90 MPa, a breaking can easily occur in the aluminum member 12 as the base metal even if strength deterioration of the weld zone 18 can be suppressed due to no brittle intermetallic compound layer is formed in the weld zone 18. This is attributed to a fact that even if there is used an aluminum member (for example, H material) which is thermally refined or well tempered to obtain higher strength, at the time of welding, a portion affected by heat (a portion which is not molten but thermally affected) in the proximity of the weld zone generally has a strength substantially equal to that of the O temper material. Among such aluminum materials, particularly, aluminum alloys of 5000 series (Al—Mg series), 6000 series (Al—Mg—Si series), and 7000 series (Al—Zn—Mg series), based on the JIS or AA alloy numbering system, are suitable as construction materials of construction products such as a body panel or decorative panel in vehicle. Additionally, since those alloys have an excellent strength, a high meltability and a high weldability, they are employed more favorably.

Meanwhile, the material of the steel member 14 located at the lower side is also not limited to a particular one and can be selected appropriately in accordance with characteristics required for an intended joint. For example, the steel member 14 may be made of mild steel, carbon steel, high tensile steel, stainless steel or the like. Additionally, the steel member 14 may be surface-coated or surface-treated steel such as a hot-dip zinc-coated steel or galvanized iron (GI), a galvannealed steel or galvanized and annealed iron (GA), aluminum alloy coated steel, and an electrogalvanized steel which are subjected to conventionally known surface treatment or surface coating with zinc, zinc alloy, aluminum or aluminum alloy, or may not be surface-coated steel. In the case of employment of a surface-coated steel member, due to the presence of a surface-coated layer formed on the steel member surface, an arc or a weld metal does not directly contact with the steel member, thereby effectively preventing penetration of the steel member and further preventing formation of a brittle intermetallic compound layer generated by a metallurgical reaction between aluminum and steel.

The shapes of the aluminum member 12 and the steel member 14 are not limited to planar shape as long as the overlapped region subjected to a MIG welding operation has at least a planar or face-plate shape. The members may have any one of various shapes produced by a known technique such as rolling, extruding, or forging. In general, a plate material, an extrusion material, or an extrusion-molded material is advantageously employed in which a portion to be welded has a planer or face-plate shape.

In the present embodiment, in order to maintain low heat input, the aluminum member 12 positioned over the steel member 14 has a thickness P ranging from 0.5 to 2.0 mm. This is because heat input required at MIG welding corresponds to the thickness P of the aluminum member 12. That is, when the thickness P thereof exceeds 2.0 mm, high heat input is required to melt the end face region of the aluminum member 12, and the steel member 14 having a melting temperature higher than the aluminum member 12 is also molten and penetrated by arc heat. Therefore, a brittle intermetallic compound is easily formed at the welded portion between the aluminum member 12 and the steel member 14, resulting in reduction of joint strength. Whereas when the thickness P of the aluminum member is less than 0.5 mm, a withstand load of the aluminum member becomes too small and thus it is not practical to use it as a construction material. Furthermore, at the time of MIG welding, heat cannot easily be dissipated from the welded portion of the aluminum member 12 and can be accumulated thereat, whereby the aluminum member 12 becomes easily melted and a size precision of the MIG welded joint 10 is deteriorated.

In the present embodiment, a thickness Q of the steel member 14 positioned under the aluminum member 12 is in a range of 0.3 to 1.6 mm, which is thinner than the aluminum member 12 by a predetermined size. Specifically, the thickness is set in such a way that a ratio Q/P, i.e., the thickness Q (mm) of the steel member to the thickness P (mm) of the aluminum member 12, falls within the range of 0.6 to 0.8. This adequately uniforms rigidities of the aluminum member 12 and the steel member 14. Accordingly, when solidification shrinkage occurs after welding process, it is possible to effectively prevent the generation of a defective portion which is caused by concentration of a stress due to thermal distortion and the subsequent local deformation at the weld zone. In other words, if the ratio of the thickness Q of the steel member 14 to the thickness P of the aluminum member 12 (Q/P) falls outside the above range, local deformation occurs at the weld zone 18, thereby generating a defective portion. If the steel member 14 is made of steel subjected to surface treatment as mentioned above, from a practical viewpoint, a sum of the thickness of a bare steel member before surface treatment and the thickness of a surface-coated layer is set as the thickness Q of the steel member 14.

Furthermore, an overlap width W between the aluminum member 12 and the steel member 14 can be set appropriately in accordance with the thickness of the aluminum member 12. Preferably, when the thickness P of the aluminum member 12 is 1 mm or less, the overlap width W is set to be 3 mm or more. If the thickness P exceeds 1 mm, preferably the overlap width W is set to be 3 times or more than the thickness P of the aluminum member 12, that is, it is preferable to be 3P or more. This is because, when the overlap width W becomes too small, heat input to the weld zone 18 is conducted to an end face 20 of the steel member 14. The heat is not dissipated outside and added as a reflected heat to the weld zone 18. As a result, due to the excessive input heat, a brittle intermetallic compound layer is thickly formed, thereby reducing the joint strength.

Thus, as described above, in the MIG welded joint 10 of the present embodiment, under the state where the aluminum member 12 and the steel member 14 having mutually different thicknesses are overlapped with each other, the MIG welding is performed on the end face region of the aluminum member 12 to integrate the two members. In this case, particularly, without using a brazing filler metal or a flux, the weld zone 18 is formed by the MIG welding using a filler wire (filler metal) made of the aluminum alloy of 4000 series (Al—Si series) or 5000 series (Al—Mg series), thus, a weld metal 19 has a high strength. Therefore, the aluminum member 12 and the steel member 14 are strongly welded with each other, so that joint strength of the MIG welded joint 10 can be highly secured. Additionally, since it is unnecessary to remove the slag and prepare a large-scale equipment, production cost can be reduced as compared to a case of using a brazing filler metal, a flux cored wire, or the like.

Moreover, in the MIG welded joint 10 of the present embodiment, the penetration of the steel member 14 can be favorably suppressed and a penetration depth is made 5% or less of the thickness Q of the steel member 14. Accordingly, the reduction of joint efficiency due to formation of a brittle intermetallic compound layer can be favorably suppressed.

Since the MIG welded joint 10 of the embodiment has the foregoing characteristic structure, the low heat input at the MIG welding can be maintained. Therefore, the soundness of the weld zone 18 can be improved and an excellent joint strength can be obtained. Consequently, the MIG welded joint 10 having the excellent joint strength can be favorably used for a vehicle body panel, bracket welding, and a construction material such as a decorative panel.

The MIG welded joint 10 between the aluminum member 12 and the steel member 14 according to the present embodiment can be obtained by welding the aluminum member 12 and the steel member 14 according to a particular MIG welding process as will be described below, for example.

Figure 3:
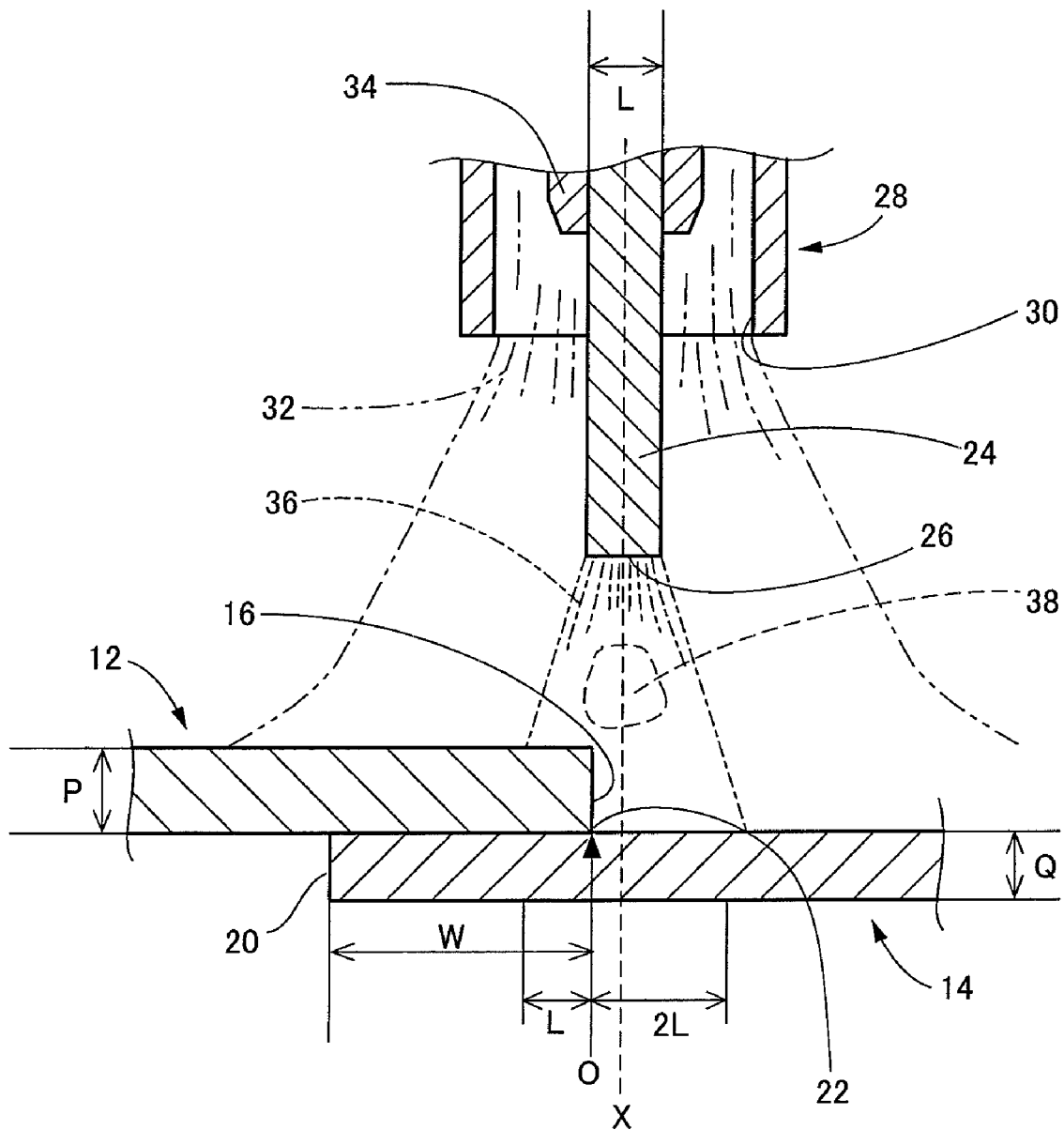
FIG. 3 is an elevational view in axial cross section showing a step of MIG welding between the aluminum and steel members according to a MIG welding process of the present invention and showing a state where the members to be welded are overlapped with each other and a nozzle of a MIG welder is located above an overlapped region from a side of the aluminum member.

Specifically, in order to obtain the MIG welded joint 10 of the present embodiment, first, as shown in FIG. 3, the planar aluminum member 12 and the planar steel member 14 having the different thicknesses (P and Q) as described above are overlapped with each other at end regions thereof in such a manner that the aluminum member 12 is positioned at the upper side. While keeping the members overlapped, the members are preferably fixed by an appropriate restraint jig, which is not shown in the drawing, so as not to move relatively to each other. Next, while keeping the members fixed, the MIG welding operation is performed at the end face region of the aluminum member 12 under a condition that has not been implemented in any known related technique.

More specifically, in the MIG welding operation of the present invention, the same MIG welder as used in the known technique is used, which has a filler wire 24 as a consumable electrode protruded by a predetermined length from a tip opening portion 30 of a nozzle 28. In the MIG welder, the filler wire 24 is allowed to be independently moved in the axial direction of the nozzle 28 by a wire supply apparatus, which is not shown in the drawing. Due to the consumption or the like of the filler wire 24, the filler wire 24 can be supplied toward the weld zone (a lower side). In addition, in order to isolate the weld metal from the atmosphere, at the arc welding process, the nozzle 28 sprays inert gas 32 (indicated by two-dotted chain lines in FIG. 3) composed of one of argon gas, helium gas, neon gas, and the like or a mixture of two or more kinds thereof onto the weld zone. Furthermore, the filler wire 24 is connected to a positive pole of a welding power supply apparatus, which is not shown, via a contact tip 34, so that the filler wire 24 has a positive polarity (anode), whereas the members 12 and 14 to be welded, which are grounded, are connected to a negative pole of the welding power supply apparatus, so that the members 12 and 14 have a negative polarity (cathode).

Figure 4:
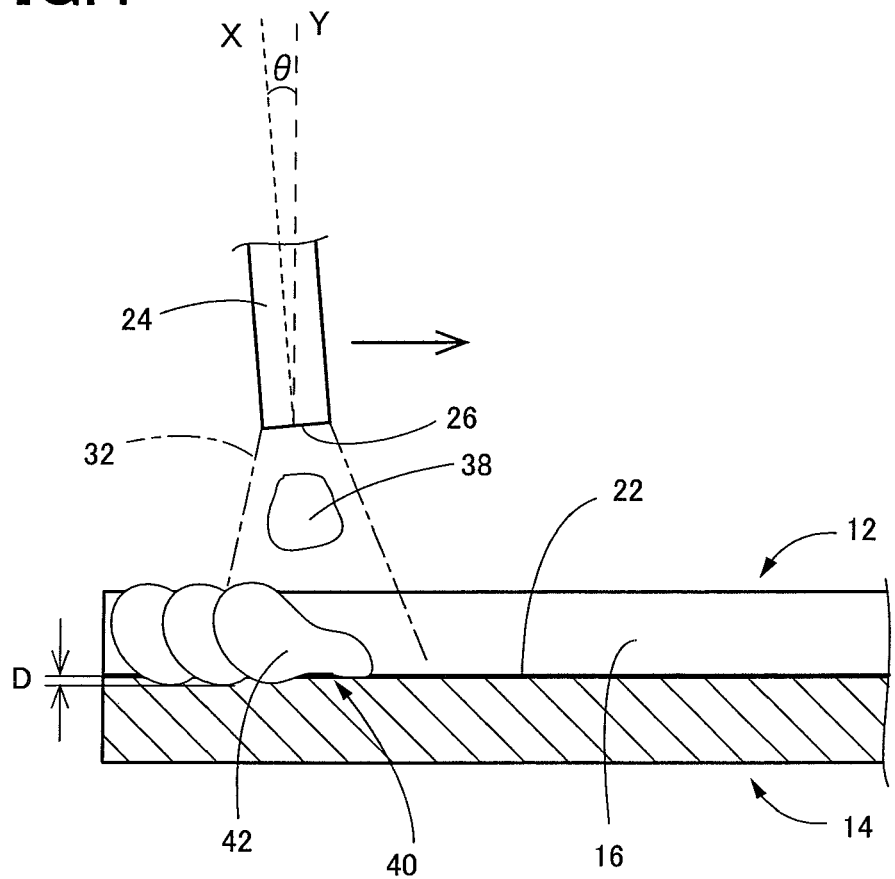
FIG. 4 is a partial cross sectional view showing a step of MIG welding between the aluminum and steel members according to the MIG welding process of the present invention and showing a metal transfer mode.
Figure 5:
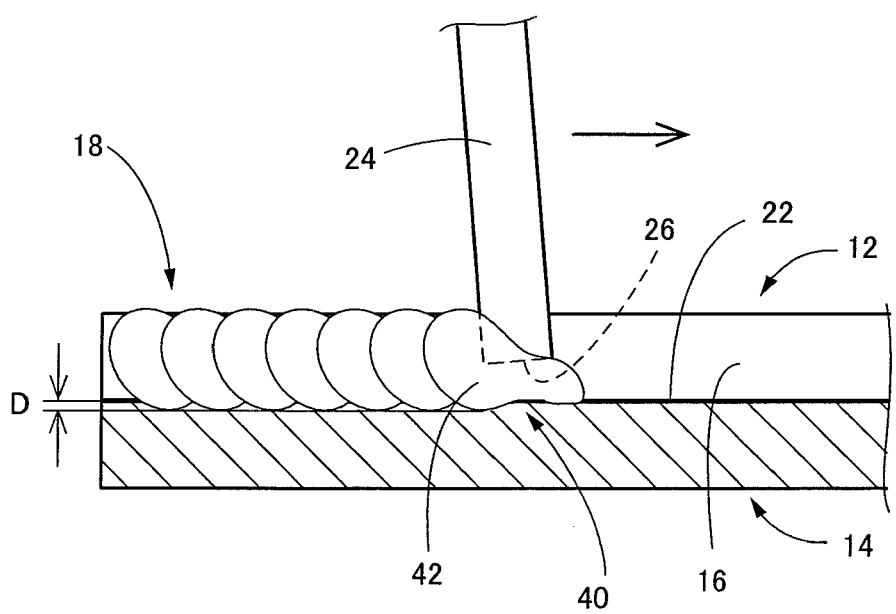
FIG. 5 is a partial cross sectional view showing a step of MIG welding between the aluminum and steel members according to the MIG welding process of the present invention and showing a short circuit mode.

Then, the not-shown welding power supply apparatus is operated to apply a welding current and an arc voltage between the filler wire 24 and the members 12 and 14 to be welded at predetermined levels, in order to generate an arc 36 (indicated by a single-dotted chain line in FIG. 3) between a tip portion 26 of the filler wire 24 and the members to be welded. Meanwhile, as shown in FIGS. 4 and 5, the nozzle 28 (filler wire 24) is moved relatively along the end face 16 of the aluminum member 12, in general, at a speed of approximately 6 to 13 mm per second, thereby proceeding the MIG welding between the aluminum member 12 and the steel member 14.

In the above situation, the arc 36 generated between the members 12, 14 to be welded and the filler wire 24 allows the end face region of the aluminum member 12 to be melted. In addition to that, the filler wire 24 is also melted and whereby a droplet 38 thereof is transferred onto the members to be welded. The molten aluminum (molten metal) welds the aluminum member 12 and the steel member 14 together, thereby forming the weld zone 18 (bead portion) made of the weld metal 19.

In the MIG welding operation, in order to strongly weld the aluminum member 12 and the steel member 14 together, as described above, the filler wire 24 may be a solid wire made of the aluminum alloy material of 4000 series (Al—Si series) or 5000 series (Al—Mg series). If a diameter L of the filler wire 24 becomes too small, it is difficult to supply the filler wire 24. If a diameter L thereof becomes too large, a large amount of a welding current is required to melt the filler wire 24, which increases the heat input, and consequently, an intermetallic compound can be easily formed by an interface reaction between the aluminum member 12 and the steel member 14, thereby producing a brittle welded interface. Consequently, the filler wire 24 used in the embodiment has a diameter L ranging from 0.8 to 1.6 mm.

In addition, in the MIG welding operation, if a target position of a torch (a nozzle position) is too distant from the end face 16 of the aluminum member 12 in a horizontal direction (in the right and left direction of FIG. 3), it is impossible to form the sound weld zone 18 having the sectional shape as shown in FIG. 2. Therefore, in the present welding operation, as shown in FIG. 3, a corner 22 of the end face 16 of the aluminum member 12 on the steel member side is set as a reference point O and the nozzle 28 (filler wire 24) is arranged such that a center line X of the filler wire 24 is constantly positioned between a distance of L away from the point O toward the overlapped region (on a left side from the point O in FIG. 3) and a distance of 2L away from the point O toward the side opposite to the overlapped region (on a right side therefrom in FIG. 3). Then, while maintaining the above position, the nozzle 28 (filler wire 24) is moved relatively along the end face 16 of the aluminum member 12. In this case, the center line X of the above filler wire 24 represents a center line of a portion of the filler wire protruding from the tip opening portion 30 of the nozzle 28.

If the center line X of the above filler wire 24 is located at a position beyond the distance of L toward the overlapped region from the reference point, high heat input is required for sufficiently melting a larger portion of the aluminum member 12 placed on the upper side. As a result, a brittle intermetallic compound layer is thickly formed. Conversely, if the center line X thereof is located at a position beyond the distance of 2L toward the opposite side of the overlapped region, the arc 36 does not reach the aluminum member 12 located at the upper side, which makes it impossible to melt the end face 16 of the aluminum member 12 or which makes it necessary to adjust a welding current or an arc voltage to increase a bead width so as to form the weld zone 18 (bead portion) at the overlapped region between the aluminum member 12 and the steel member 14. As a result, heat input becomes excessively high, so that a brittle intermetallic compound layer is likely to be thickly formed. Moreover, the arc becomes unstable and whereby a sound weld zone appearance may not be obtained.

Furthermore, in the MIG welding operation of the present embodiment, particularly, a pulsed DC (see FIG. 6) is applied to the filler wire 24, which allows one droplet to fall with each pulse (see FIG. 4) at a pulse frequency of 0.5 to 5 times per a welding length of 1 mm. By applying the pulsed DC, a cleaning action for removing an oxide film on a surface of the base metal can be exhibited, thereby improving weldability. In addition, since heat input can be controlled at a low level, penetration of the steel member 14 can favorably be prevented.

In the above situation, the reason for applying the pulsed current is as follows. In a case of a non-pulsed DC, an average welding current level becomes higher and whereby heat input to the base metal becomes excessively high. Therefore, a regular metal transfer is stably performed at a low average welding current level, which allows the heat input to be controlled at a low level, so that heat more than necessary is not applied to the members to be welded. In addition, the reason for employing the pulsed DC instead of pulsed AC is as follow. The cleaning action to the members to be welded can be constantly exhibited by maintaining the filler wire 24 constantly as the positive pole (anode), whereby the zone to be welded is set to have a clean metallic surface (a refreshed surface). Thus, the molten aluminum can effectively be spread wettingly on the zone to be welded, so that the sound weld zone 18 can be formed. In the case of AC, at the time when the filler wire 24 is switched from the positive pole to the negative pole, the cleaning action cannot be exhibited. Thus, a defective portion is likely to be generated at the weld zone 18.

As described above, a major characteristic of the MIG welding operation is that the pulsed DC is adjusted to allow one droplet 38 to detach from the tip portion 26 of the filler wire 24 with each pulse regularly and also the pulse frequency to be in the range of 0.5 to 5 times per a welding length of 1 mm. With the pulsed DC applied, the foregoing cleaning action can be effectively exhibited, thereby increasing the wettability of the surface of the steel member 14. As a result, molten metals of the aluminum member 12 and the filler wire 24 can favorably be spread wettingly without being repelled from the surface of the steel member 14 and rolled thereon. In addition, due to the control of heat input, the end face region of the aluminum member 12 is sufficiently molten, while penetration of the steel member 14 can be effectively prevented, thereby forming the sound weld zone 18 without any defect. Consequently, any breaking or separation at a welded interface can be favorably prevented.

When one droplet per pulse is not transferred, more specifically, when one droplet per several pulses is transferred, a continuous bead cannot be obtained and a defective portion is formed. In addition, when several droplets per pulse are transferred, a pulsed current density is increased and heat input becomes excessively high, thereby thickly forming a brittle intermetallic compound layer at the welded interface, as well as there arises a problem of increasing the amount of spatter. As can be seen from the above, when one droplet per pulse is not transferred, in any case, a breaking or separation can occur at the weld zone.

Meanwhile, when the above pulse frequency is less than 0.5 times/mm, as in the case of the one droplet per several pulses described above, a continuous bead cannot be obtained, so that the sound weld zone 18 cannot be formed. When the pulse frequency is more than 5 times/mm, heat input to the welded members becomes excessively high, and consequently, a brittle intermetallic compound layer is thickly formed at the welded interface. In the both cases, a breaking or separation at the weld zone is likely to be occurred. The pulse frequency (times/mm) can be appropriately adjusted by changing the pulse frequency (times/s) according to a welding speed (mm/s), or conversely by changing the welding speed according to the pulse frequency (times/s). When the welding speed is fast, the pulse frequency (times/s) is adjusted to be increased and when the welding speed is slow, the pulse frequency (times/s) is adjusted to be decreased, thereby adjusting the pulse frequency (times/mm) to fall within the above range.

In addition, in the MIG welding operation of the present embodiment, as shown in FIG. 5, while applying the foregoing pulsed DC such that a molten weld pool 42 is constantly formed at an immediately-below-arc portion 40 (a portion 40 located immediately below the arc), the filler wire 24 is moved downwardly by the not-shown wire supply apparatus. Then, the tip portion 26 of the filler wire 24 is inserted into the molten weld pool 42 formed at the immediately-below-arc portion 40 at the frequency of 0.1 to 4 times per a welding length of 1 mm in order to cause short circuit. Thereafter, the tip portion 26 of the filler wire 24 is pulled up from the molten weld pool 42.

By inserting the tip portion 26 of the filler wire 24 into the molten weld pool 42 to contact therewith, the metal transfer mode is changed into a short circuit transfer mode. Therefore, an overheat of the immediately-below-arc portion 40 can be prevented, so that heat input can be further practically controlled. More specifically, under the state where the filler wire 24 is in contact with the molten weld pool 42 (the short circuit transfer mode), there is no heat input by the arc and the filler wire 24 is molten by heat of the molten weld pool 42 (heat of the molten metal). Thereby, the heat is drawn from the molten weld pool 42 and a temperature of the immediately-below-arc portion 40 is reduced. Accordingly, the overheat of the immediately-below-arc portion 40 can be effectively prevented by short-circuiting with predetermined frequency. As a result, even when the molten weld pool 42 is formed, penetration of the steel member 14 can be favorably prevented. Thus, in the MIG welding operation of the present embodiment, due to a collaborative mechanism between the heat input control by the foregoing pulsed DC and the prevention of overheat of the immediately-below-arc portion 40 by a short circuit, heat input to the welded members can be more practically and easily controlled than in the conventional known techniques.

When the molten weld pool 42 is not formed at the immediately-below-arc portion 40 of the arc, it is impossible to form a continuous bead by melting the tip portion 26 of the filler wire 24 at the time of short-circuiting, whereby a defective portion is likely to be formed due to insufficient melting. In addition, when the short circuit frequency is less than 0.1 times per a welding length of 1 mm, effect by short circuit cannot be sufficiently obtained. Conversely, when the short circuit frequency is more than 4 times per mm, the temperature of the weld metal becomes too low, and thus the filler wire 24 cannot be molten.

Figure 6:
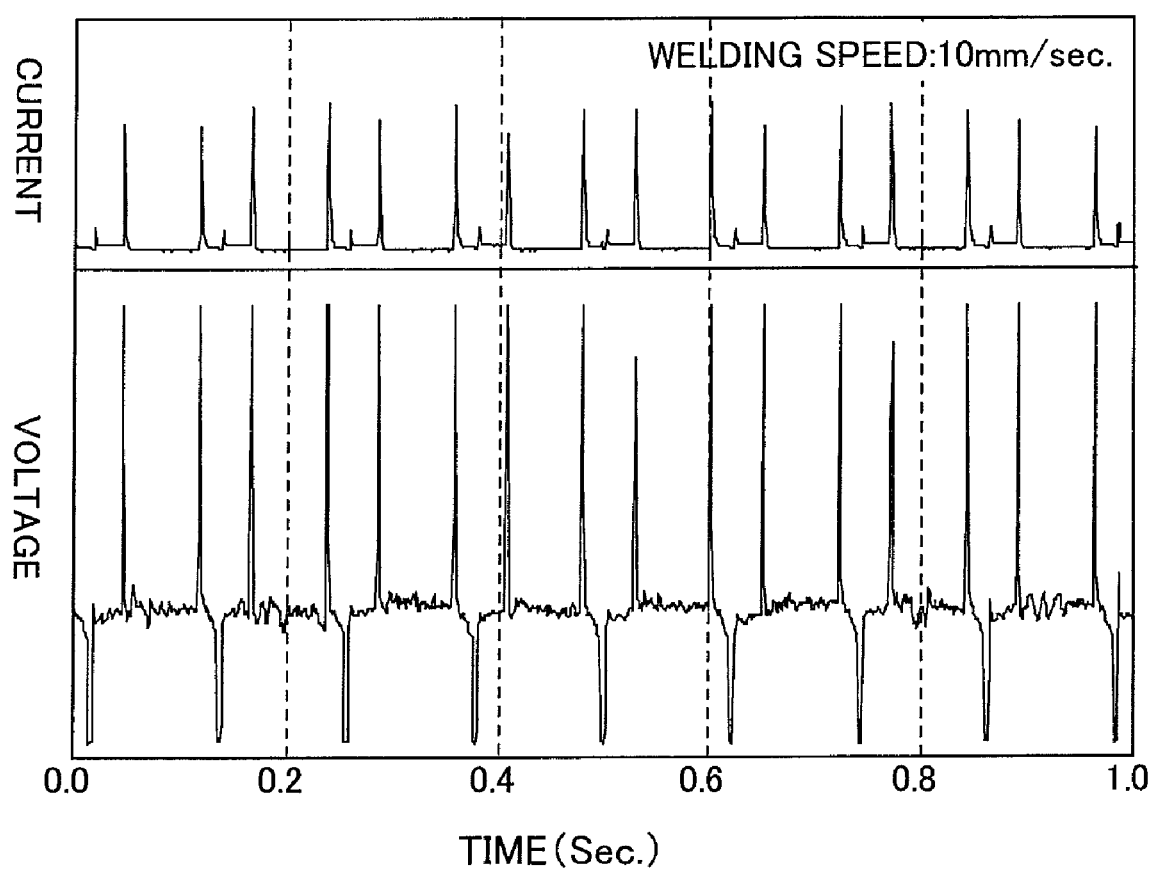
FIG. 6 is an explanatory diagram showing an example of waveforms of a pulsed DC and an arc voltage used in the MIG welding process according to the present invention, in which the waveform of the pulsed DC is shown in an upper side and the waveform of the arc voltage corresponding to the current is shown in a lower side.

When using the above-described pulsed DC and short circuit, a pulse shape (waveform), a peak current value, a base current value, a short circuit duration, and the like can be appropriately adjusted according to the value of an arc voltage to be applied, the kind of the filler wire 24, the diameter thereof, and the like. For example, in FIG. 6, there is shown an example of a current waveform and a corresponding arc voltage waveform arranged in upper and lower directions. Then, for example, while applying such a pulsed DC, welding may be performed at a speed of 10 mm/second, which can favorably realize a one-droplet-per-pulse transfer mode in which one droplet is transferred per pulse. In the current waveform shown in FIG. 6, 16 peaks per second appear. Thus, when the welding speed is 10 mm/second, the pulse frequency is 1.6 times per a welding length of 1 mm. Additionally, portions protruding downwardly in the arc voltage waveform result from a reduced potential difference between the filler wire 24 and the welded members at the time of short-circuiting the filler wire 24 to the molten weld pool 42. Thus, since there are nine protruding portions per second, the short circuit frequency is 0.9 times per a welding length of 1 mm, at the welding speed of 10 mm per second. In FIG. 6, a pulsed DC is applied twice in order to transfer one droplet with each pulse to the members to be welded, and then a short circuit operation is performed once to reduce the temperature of the molten weld pool 42. Thereafter, a pulsed DC is applied twice and then a short circuit operation is performed once, again. FIG. 6 shows that the operations were repeated.

As described above, in the state where the aluminum member 12 and the steel member 14 having the predetermined thicknesses are overlapped with each other and the filler wire 24 made of an aluminum alloy of the 4000 or 5000 series is arranged at the predetermined position, the pulsed DC is applied to the filler wire 24 so as to constantly form the molten weld pool at the welding zone. The pulsed DC allows one droplet to fall with each pulse at the pulse frequency of 0.5 to 5 times per a welding length of 1 mm, while allowing the filler wire to come into contact with the molten weld pool at the frequency of 0.1 to 4 times per a welding length of 1 mm to cause short circuit, thereby performing the MIG welding operation. As a result, the aluminum member 12 and the steel member 14 are arc-welded and integrated with each other, so that the intended MIG welded joint 10 can be obtained. In the obtained MIG welded joint 10, as described above, penetration of the steel member 14 can be favorably suppressed. Thus, regardless of the presence or absence of the surface-coated layer on the steel member surface, the penetration depth D of the steel member 14 is set to an approximately 0% to 5% of the thickness Q of the steel member 14, which can prevent that an intermetallic compound layer is thickly formed at the welded interface and suppress deformation due to heat distortion at the weld zone. As a result, the soundness of the weld zone can be favorably increased.

Accordingly, when the aluminum member 12 and the steel member 14 are welded with each other by using the above special MIG welding process, the soundness of the weld zone can be increased, thereby advantageously obtaining a MIG welded joint with an excellent welding quality.

While the present invention has been described in detail, for the illustrative purpose only, it is to be understood that the invention is not limited to the details of the illustrated embodiment.

For example, in the above embodiment, the corner 22 of the aluminum member 12 that is positioned on the steel member side has right angle (90 degrees). However, the MIG welding process according to the present invention can also be applied to a case of using the aluminum member 12 that has the corner on the steel member side sharpen by beveling or edge preparation.

In addition, in the above example, as apparent from FIG. 3, the center line X of the filler wire 24 is in parallel to the end face of the aluminum member 12. However, it is also possible to perform the MIG welding operation by inclining the nozzle 28 with respect to the end face thereof. Even in this case, as described above, the nozzle 28 (the filler wire 24) is arranged such that the center line X of the filler wire 24 is positioned between the distance of L away from the corner 22 on the steel member side (the reference point O) toward the overlapped region and the distance of 2L away from the corner 22 toward the side opposite to the overlapped region. More specifically, the nozzle 28 (the filler wire 24) is arranged such that an intersecting point between the center line X of the filler wire 24 and the upper surface of the steel member 14 is positioned within the above range.

FIG. 4 shows the MIG welding operation in which the nozzle 28 (filler wire 24) is inclined such that the angle θ formed by a vertical line Y extending in a direction intersecting perpendicularly to a horizontal direction (namely, in upper and lower directions in FIG. 4) and the center line X of the filler wire 24 is in the range of 5 degree or less. However, the inclination angle of the nozzle 28 (filler wire 24) can be appropriately determined as in the conventional MIG welding technique.

In the above example, the short circuit operation is performed by the not-shown wire supply apparatus which changes the amount of the protrusion of the filler wire 24 from the tip opening portion 30 of the nozzle 28. However, the short circuit operation is not limited to the foregoing process. For example, by moving the nozzle 28 or the members to be welded up and down, the tip portion 26 of the filler wire 24 can be contacted (short circuited) with the molten weld pool 42. In addition, the short circuit operation can also be performed by any one of known processes.

It is to be understood that the present invention may be embodied with various modifications which may occur to the those skilled in the art, without departing from the spirit and scope of the invention.

EXAMPLES

Hereinafter, various examples of the present invention will be provided to further clarify the invention. However, it is to be understood that the present invention is not limited to the details of the examples.

<Experiment 1> First, as shown in the following Table 1, as the aluminum member (Al member; 12), there is prepared an aluminum plate (5052, H material) of the 5000 series having a thickness (P) of 0.5 mm and tensile strength of 195 MPa in an O temper condition. As the steel member (14), there is prepared an uncoated mild steel plate having a thickness (Q) of 0.3 mm. Then, the aluminum member (12) and the steel member (14) are overlapped with each other and fixed so as to have the overlap width (W) of 3 mm. The tensile strength of the Al member in the O temper condition was measured based on the JIS Z 2241 by using a plate specimen (No. 5) defined in the JIS Z 2201.

Next, as the MIG welder, a precision control type MIG welder was used that is equipped with the filler wire (24) made of a 4000 series aluminum alloy (4043) and having a diameter (L) of 0.8 mm. The MIG welder is connected to the welding power supply equipment such that the filler wire (24) is connected to the positive pole and the members to be welded are connected to the negative pole. Thereafter, arc is generated between the welder and the members to be welded, and the nozzle (28) of the MIG welder is moved relatively along the end region of the aluminum member (12) at the welding speed of 10 mm per second. As a result, the MIG welding was performed and a MIG welded joint of Experiment 1 was obtained.

Specifically, as shown in the following Table 2, a pulsed DC was applied so as to allow one droplet per pulse and 0.5 times of pulse per a welding length of 1 mm (pulse frequency) and a molten weld pool is constantly formed at the weld zone. Meanwhile, by changing the amount of the protrusion of the filler wire, the tip portion of the filler wire was contacted with the molten weld pool at the frequency of 4 times per a welding length of 1 mm to be short circuited therewith. Additionally, the nozzle (28) was arranged such that the center line X of the filler wire is located at a distance of 0.8 mm toward the overlapped region from the corner (22) of the aluminum member (12) located on the steel member side. Then, while the torch position was maintained, the nozzle (28) was moved relatively along the end region of the aluminum member (12) to perform the MIG welding process.

Then, by using the MIG welded joint obtained in the above manner according to Experiment 1, measurement of the penetration depth of the steel member and a tensile test (tension shear test) were performed.

Specifically, in order to perform the measurement of the penetration depth of the steel member, a cross section of the weld zone was observed to measure a distance between the deepest portion and the steel member surface in a molten portion of the steel member with a metal microscope (EPIPHOT 300 produced by NIKON CORPORATION). Then, by using the following formula, a penetration ratio of the steel member was calculated. As a result, the penetration ratio in the MIG welded joint of Experiment 1 was 3.3%.

Penetration ratio (%) of the steel member=(Penetration depth of the steel member/Thickness of the steel member)×100

The tensile strength test (tension shear test) of the welded joint was conducted based on the JIS Z 2241, as in the above-described tensile strength test of the material in O temper condition. Specifically, a test specimen (grip portion width: 30 mm, parallel portion width: 25 mm, radius of fillet (R): 30 mm, and reference point distance: 50 mm) was produced. Then, an extensometer was mounted on the test specimen. Until the extensometer indicated a value of 1 mm, a cross head speed of the tensile testing machine was set to 5 mm per second, and after indicating 1 mm, the cross head speed thereof was set to 50 mm per minute and the specimen was pulled until the test specimen is broken. Then, based on an obtained maximum load, a maximum stress of the joint and a joint efficiency were calculated by the following formula. As a result, regarding the MIG welded joint of Experiment 1, the maximum stress (breaking stress) of the joint was 195 MPa and the joint efficiency was 100%.

Maximum stress of joint (MPa)=(Maximum load of joint/Cross-sectional area of Al member)

Joint efficiency (%)=(Maximum stress of joint/Tensile strength of Al member in O temper condition)×100

Results obtained by the tension shear test were evaluated based on the following evaluation criteria, which indicated that the MIG welded joint of Experiment 1 was evaluated as "excellent".

Excellent: satisfies all of conditions (1) to (3) below;

Very good: dissatisfies only the condition (3) below;

Good: dissatisfies the condition (2) below; and

Poor: dissatisfies the condition (1) below.

Conditions:

(1) Joint efficiency is 50% or more.

(2) Breaking occurs not at the weld zone (the welded interface) but in the Al member as the base metal.

(3) Maximum stress of the joint is 70 MPa or more.

<Experiments 2 to 33> Like the above Experiment 1, as the Al member (12) and the steel member (14), two plate members were prepared that has a material, a thickness, and a tensile strength in a O temper condition that are shown in the following Table 1. The plate members were overlapped with each other and fixed so as to have the overlap width (W) shown in the Table 1. Regarding the temper of the Al member, the temper H was employed for aluminum members made of 1000 and 5000 series, and the temper T was employed for aluminum members made of 6000 and 7000 series.

Next, by using the MIG welder equipped with the filler wire (24) made of aluminum alloy each having diameter (L) and material shown in the Table 1, a welding current and an arc voltage were applied such that the filler wire (24) has the positive polarity to generate an electric arc between the members to be welded and the filler wire. Then, the nozzle (28) of the MIG welder was moved relatively along the end region of the aluminum member (12) at the welding speed of 10 mm per second to perform the MIG welding process, so that a MIG welded joint of each of Experiments 2 to 33 was obtained. In the MIG welding operations, conditions shown in the following Table 2 were employed, which includes the position of the center line X of the filler wire, the number of droplet per pulse, the pulse frequency, and the short circuit frequency.

After that, using the each obtained MIG welded joint of Experiments 2 to 33, measurement of the penetration depth and the tension shear test as described above were performed. Results thereof were shown together in the following Table 2.

TABLE 1

| EXPERIMENTS | Al Member Material | Tensile Strength in O temper condition [MPa] | P [mm] | Steel Member Material | Q [mm] | Q/P | W [mm] | Filler Wire Material | L [mm] |
|---|---|---|---|---|---|---|---|---|---|
| 1 | 5052 | 195 | 0.5 | Mild Steel Sheet | 0.30 | 0.6 | 3 | 4043 | 0.8 |
| 2 | 5182 | 270 | 0.8 | GI Steel Plate | 0.56 | 0.7 | 4 | 4047 | 1.0 |
| 3 | 6009 | 120 | 1.0 | GA Steel Plate | 0.80 | 0.8 | 5 | 5554 | 1.2 |
| 4 | 6010 | 140 | 1.2 | High Strength Steel | 0.72 | 0.6 | 4 | 5654 | 1.6 |
| 5 | 7075 | 230 | 1.5 | SUS | 1.05 | 0.7 | 5 | 5356 | 0.8 |
| 6 | 5456 | 310 | 1.8 | Aluminum-coated Steel Plate | 1.44 | 0.8 | 6 | 5556 | 1.0 |
| 7 | 5083 | 290 | 2.0 | Mild Steel Sheet | 1.20 | 0.6 | 6 | 5183 | 1.2 |
| 8 | 6111 | 140 | 0.5 | GI Steel Plate | 0.35 | 0.7 | 4 | 4043 | 1.6 |
| 9 | 6016 | 110 | 0.8 | GA Steel Plate | 0.64 | 0.8 | 5 | 4047 | 0.8 |
| 10 | 7003 | 190 | 1.0 | High Strength Steel | 0.60 | 0.6 | 3 | 5554 | 1.0 |
| 11 | 5056 | 290 | 1.2 | SUS | 0.84 | 0.7 | 4 | 5654 | 1.2 |
| 12 | 5N01 | 110 | 1.5 | Aluminum-coated Steel Plate | 1.20 | 0.8 | 5 | 5356 | 1.6 |
| 13 | 6061 | 120 | 1.8 | Mild Steel Sheet | 1.08 | 0.6 | 6 | 5556 | 0.8 |
| 14 | 6063 | 90 | 2.0 | GI Steel Plate | 1.40 | 0.7 | 6 | 5183 | 1.0 |
| 15 | 7N01 | 200 | 0.5 | GA Steel Plate | 0.40 | 0.8 | 5 | 4043 | 1.2 |
| 16 | 5154 | 235 | 0.8 | High Strength Steel | 0.48 | 0.6 | 3 | 4047 | 1.6 |
| 17 | 5454 | 250 | 1.0 | SUS | 0.70 | 0.7 | 4 | 5554 | 0.8 |
| 18 | 6N01 | 100 | 1.2 | Aluminum-coated Steel Plate | 0.96 | 0.8 | 4 | 5654 | 1.0 |
| 19 | 6061 | 120 | 1.5 | GI Steel Plate | 0.90 | 0.6 | 5 | 5356 | 1.2 |
| 20 | 7075 | 230 | 1.8 | GA Steel Plate | 1.26 | 0.7 | 6 | 5556 | 1.6 |
| 21 | 1060 | 70 | 0.8 | GA Steel Plate | 0.60 | 0.8 | 5 | 4047 | 0.8 |
| 22 | 5022 | 275 | 0.8 | High Strength Steel | 0.64 | 0.8 | 2 | 5356 | 0.8 |
| 23 | 7178 | 230 | 1.5 | SUS | 0.90 | 0.6 | 4 | 5556 | 1.2 |
| 24 | 6N01 | 100 | 0.5 | Aluminum-coated Steel Plate | 0.35 | 0.7 | 3 | 5183 | 0.8 |
| 25 | 5083 | 290 | 0.8 | Mild Steel Sheet | 0.64 | 0.8 | 3 | 4043 | 0.8 |
| 26 | 6063 | 90 | 1.2 | GA Steel Plate | 0.84 | 0.7 | 4 | 5554 | 1.2 |
| 27 | 7075 | 230 | 1.5 | High Strength Steel | 1.20 | 0.8 | 5 | 5654 | 1.6 |
| 28 | 5083 | 290 | 1.0 | SUS | 0.70 | 0.7 | 4 | 4043 | 0.8 |
| 29 | 7075 | 230 | 1.0 | Aluminum-coated Steel Plate | 0.50 | 0.5 | 3 | 4043 | 1.0 |
| 30 | 5052 | 195 | 1.2 | Mild Steel Sheet | 1.08 | 0.9 | 4 | 4047 | 1.2 |
| 31 | 7178 | 230 | 0.3 | High Strength Steel | 0.21 | 0.7 | 3 | 5556 | 0.8 |
| 32 | 5N01 | 110 | 3.0 | SUS | 2.40 | 0.8 | 9 | 5183 | 1.6 |
| 33 | 6063 | 90 | 0.8 | GA Steel Plate | 0.60 | 0.8 | 5 | 1100 | 0.8 |

TABLE 2

| EXPERIMENTS | Welding Condition Position of X* [mm] | Number of Droplet per pulse | Pulse Frequency [time(s)/mm] | Short-Circuit Frequency [time(s)/mm] | Penetration of Steel Material Depth [mm] | Penetration Rate [%] | Shear Tension Test Joint Efficiency [%] | Breaking Region | Breaking Stress [MPa] | Evaluation |
|---|---|---|---|---|---|---|---|---|---|---|
| 1 | −0.8 | 1 | 0.5 | 4 | 0.010 | 3.3 | 100 | Base Metal | 195 | Excellent |
| 2 | −0.5 | 1 | 1 | 3 | 0.027 | 4.8 | 100 | Base Metal | 270 | Excellent |
| 3 | 0 | 1 | 2 | 3 | 0.030 | 3.8 | 79 | Base Metal | 95 | Excellent |
| 4 | +0.8 | 1 | 3 | 2 | 0.010 | 1.4 | 80 | Base Metal | 112 | Excellent |
| 5 | +0.8 | 1 | 4 | 1 | 0.030 | 2.9 | 83 | Base Metal | 191 | Excellent |
| 6 | +1.5 | 1 | 4 | 0.6 | 0.030 | 2.1 | 100 | Base Metal | 310 | Excellent |
| 7 | +2.4 | 1 | 5 | 0.4 | 0.010 | 0.8 | 100 | Base Metal | 290 | Excellent |
| 8 | −1.6 | 1 | 1 | 2 | 0.016 | 4.6 | 80 | Base Metal | 112 | Excellent |
| 9 | −0.4 | 1 | 0.5 | 4 | 0.030 | 4.7 | 79 | Base Metal | 87 | Excellent |
| 10 | 0 | 1 | 4 | 4 | 0.020 | 3.3 | 84 | Base Metal | 160 | Excellent |
| 11 | +0.6 | 1 | 4 | 1 | 0.020 | 2.4 | 100 | Base Metal | 290 | Excellent |
| 12 | +1.6 | 1 | 5 | 0.5 | 0.010 | 0.8 | 100 | Base Metal | 110 | Excellent |
| 13 | +1.2 | 1 | 5 | 0.4 | 0.005 | 0.5 | 78 | Base Metal | 94 | Excellent |
| 14 | +2.0 | 1 | 2 | 1 | 0.030 | 2.1 | 79 | Base Metal | 71 | Excellent |
| 15 | −1.2 | 1 | 3 | 3 | 0.017 | 4.3 | 82 | Base Metal | 164 | Excellent |
| 16 | −0.8 | 1 | 2 | 3 | 0.005 | 1.0 | 100 | Base Metal | 235 | Excellent |
| 17 | 0 | 1 | 1 | 2 | 0.005 | 0.7 | 100 | Base Metal | 250 | Excellent |
| 18 | +0.5 | 1 | 1 | 2 | 0.020 | 2.1 | 79 | Base Metal | 79 | Excellent |
| 19 | +1.2 | 1 | 1 | 2 | 0.020 | 2.2 | 77 | Base Metal | 92 | Excellent |
| 20 | +2.4 | 1 | 1 | 1 | 0.030 | 2.4 | 84 | Base Metal | 193 | Excellent |
| 21 | −0.4 | 1 | 0.5 | 4 | 0.030 | 5.0 | 94 | Base Metal | 66 | Very Good |
| 22 | −0.8 | 1 | 2 | 3 | 0.030 | 4.7 | 100 | Interface | 275 | Good |
| 23 | +1.8 | 1 | 4 | 1 | 0.020 | 2.2 | 73 | Interface | 168 | Good |

TABLE 2-continued

| | Welding Condition | | | | Penetration of Steel Material | | Shear Tension Test | | | |
|---|---|---|---|---|---|---|---|---|---|---|
| | | Pulse | | | | | | | | |
| EXPERIMENTS | Position of X<sup>✕</sup> [mm] | Number of Droplet per pulse | Frequency [time(s)/ mm] | Short-Circuit Frequency [time(s)/mm] | Depth [mm] | Penetration Rate [%] | Joint Efficiency [%] | Breaking Region | Breaking Stress [MPa] | Evaluation |
| 24 | −1.6 | 1 | 0.5 | 1 | 0.014 | 4.0 | 69 | Interface | 69 | Good |
| 25 | +2.0 | 1 | 1 | 2 | 0.030 | 4.7 | 90 | Interface | 261 | Good |
| 26 | −0.6 | 0.5 | 3 | 2 | 0.030 | 3.6 | 70 | Interface | 63 | Good |
| 27 | 0 | 2 | 1 | 1 | 0.030 | 2.5 | 65 | Interface | 150 | Good |
| 28 | +1.3 | 1 | 0.8 | 5 | 0.014 | 2.0 | 54 | Interface | 157 | Good |
| 29 | 0 | 2 | 8 | 2 | 0.020 | 4.0 | 40 | Interface | 92 | Poor |
| 30 | +0.6 | 2 | 9 | 1 | 0.040 | 3.7 | 40 | Interface | 78 | Poor |
| 31 | −0.8 | 2 | 10 | 4 | 0.030 | 14.3 | 40 | Interface | 92 | Poor |
| 32 | −0.8 | 2 | 10 | 0.1 | 0.030 | 1.3 | 40 | Interface | 44 | Poor |
| 33 | −0.4 | 2 | 10 | 4 | 0.030 | 5.0 | 40 | Interface | 36 | Poor |

✕The corner of the Al member on the steel member side was set as a reference point (O), and the overlapped region was defined as (−) side and the opposite side thereof was defined as (+) side.

As obvious from the results shown in the Table 2, in the each MIG welded joint of Experiments 1 to 20, the penetration depth of the steel member is 5% or less of the thickness of the steel member, as well as the evaluation result of the tension test was "excellent", which shows that the aluminum and steel members were very favorably welded. In the MIG welded joint of Experiment 21, as the aluminum member, there was used an aluminum plate of 1000 series having tensile strength of less than 90 MPa in O temper condition. Accordingly, although it is inferior in breaking stress, breaking occurred in the base metal, that is, the welding by the MIG welding has been favorably performed.

In the each MIG welded joint of Experiments 22 and 23, the amount of the overlap width was not sufficient and a breaking or a separation occurred at a welded interface. However, the experiments have a high joint efficiency of 100% and 73%, respectively. In the each MIG welded joint of Experiments 24 to 28, one of the welding conditions (the position of X, the number of droplet per pulse, and the short-circuit frequency) shown in the Table 2 fell outside the range described above, thereby a breaking or a separation occurred at the welded interface. However, the experiments have a joint efficiency of 50% or more. Therefore, the tensile strength of each Experiments 22 to 28 is evaluated as "Good".

In the each MIG welded joint of Experiments 29 to 33, there was employed the steel member whose ratio of the thickness to the thickness of the aluminum member (Q/P) does not fall within the range of 0.6 to 0.8, or the aluminum member whose thickness does not fall within the range of 0.5 to 2.0 mm, or the filler wire which was made of an aluminum alloy of 1000 series. Consequently, any of the experiments has a low joint efficiency of 40% and the tensile strength was evaluated as "Poor".

What is claimed is:

1. A process for performing MIG welding between aluminum and steel members, by overlapping the aluminum member with the steel member and performing a MIG welding operation on an end face of the aluminum member, said process comprising the steps of:

providing an aluminum member having a thickness P ranging from 0.5 to 2.0 mm and a steel member having a thickness Q satisfying the following formula:

$0.6 \leq Q/P \leq 0.8$;

providing a filler wire made of a 4000 or 5000 series aluminum alloy having a diameter L ranging from 0.8 to 1.6 mm;

locating the filler wire such that, a center line of the filler wire is positioned between a distance of L away from a reference point toward an overlapped region of the aluminum member and the steel member and a distance of 2 L away from the reference point toward a side opposite to the overlapped region, the reference point being set at a corner of the end face of the aluminum member on the steel member side; and applying a pulsed DC to the filler wire so as to constantly form a molten weld pool at a weld zone, the pulsed DC allowing one molten droplet to fall with each pulse at a pulse frequency of 0.5 to 5 times per a welding length of 1 mm, while allowing the filler wire to come into contact with the molten weld pool at a frequency of 0.1 to 4 times per a welding length of 1 mm in order to cause a short circuit, whereby the MIG welding operation is performed along the end face of the aluminum member.

2. The process for performing MIG welding between aluminum and steel members according to claim 1, wherein the aluminum member has a tensile strength of 90 MPa or more in an O temper condition.

3. The process for performing MIG welding between aluminum and steel members according to claim 1, wherein the aluminum member is selected from the group consisting of a 5000 series aluminum alloy, a 6000 series aluminum alloy, and a 7000 series aluminum alloy.

4. The process for performing MIG welding between aluminum and steel members according to claim 1, wherein the aluminum member and the steel member are overlapped with each other such that an overlap width is 3 mm or greater when the thickness P of the aluminum member is 1 mm or less, while the overlap width is 3P or greater when the thickness P thereof exceeds 1 mm.

5. The process for performing MIG welding between aluminum and steel members according to claim 1, wherein the steel member is selected from the group consisting of non-surface-coated mild steel, carbon steel, high tensile strength steel, and stainless steel.

6. The process for performing MIG welding between aluminum and steel members according to claim 1, wherein the steel member is selected from the group consisting of hot-dip zinc-coated steel, galvannealed steel, aluminum alloy coated steel, and electrogalvanized steel.

7. A MIG welded joint between aluminum and steel members formed according to the process of claim 1, wherein a penetration depth of the steel member is 5% or less of the thickness Q thereof.

8. The MIG welded joint between aluminum and steel members according to claim 7, wherein the aluminum member has a tensile strength of 90 MPa or more in an O temper condition.

\* \* \* \* \*